Figure 4:
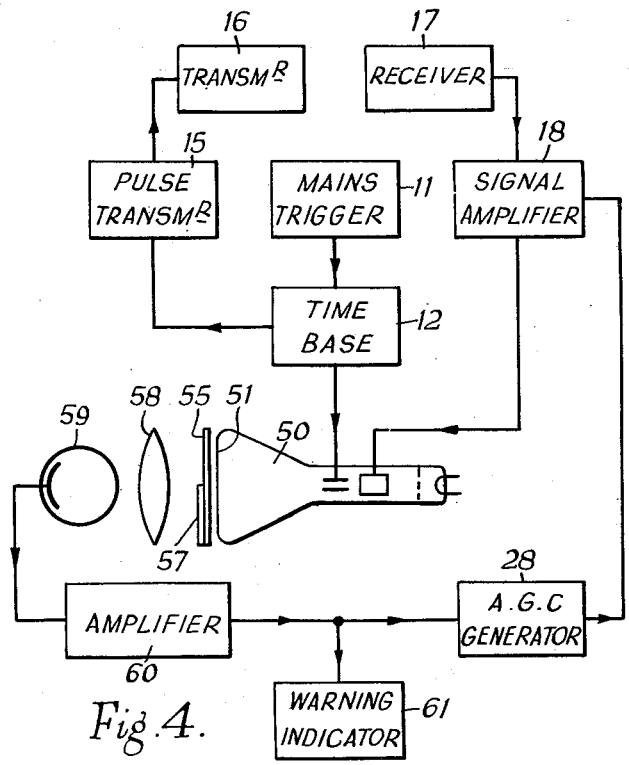

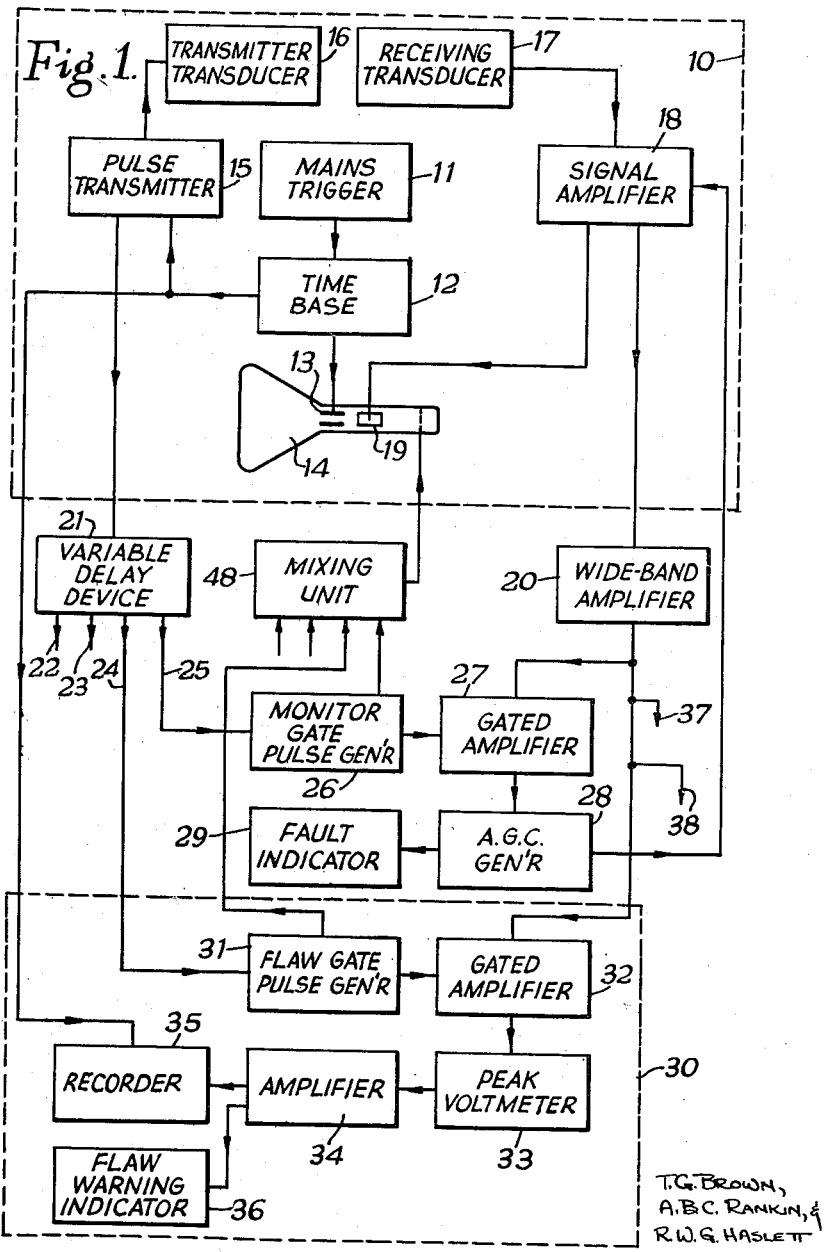

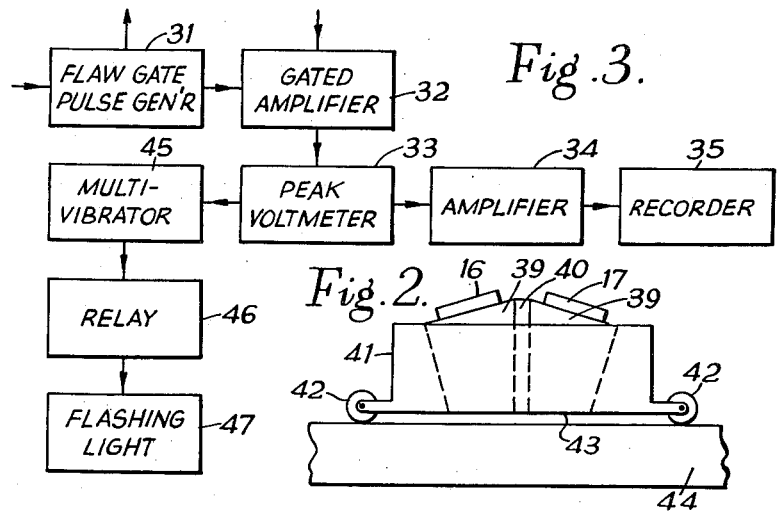
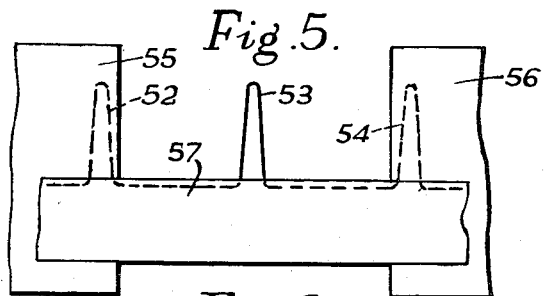
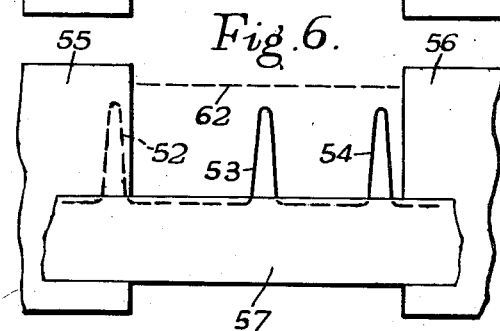
T. G. BROWN,
A. B. C. RANKIN, &
R. W. G. HASLETT
INVENTORS
BY Moore & Hall
ATTORNEYS

United States Patent Office 3,041,872
Patented July 3, 1962

3,041,872
APPARATUS FOR ULTRASONIC TESTING OF MATERIALS
Thomas G. Brown, Kelvin Works, Kelvin Ave., Hillington, Glasgow SW. 2, Scotland, and Alexander Bryce Calder Rankin and Roy William George Haslett, both of Husun Works, New North Road, Barkingside, Essex, England
Filed Feb. 17, 1956, Ser. No. 566,279
Claims priority, application Great Britain Feb. 21, 1955
11 Claims. (Cl. 73—67.9)

This invention relates to the ultrasonic inspection of materials and has particular reference to production testing apparatus.

The testing of materials during production may be effected by several methods. For instance, the materials may be moved through a fixed testing site or alternatively the materials may be stationary and an inspecting probe may be moved over the materials. Using either of these methods the materials are in fact scanned by relative mechanical movement. It is however possible to present separate specimens to testing apparatus in sequence and no relative movement is then required whilst the testing apparatus is in contact with the specimen. All of these methods of testing may be continuous and automatic and, as such, allow the use of scanning speeds considerably greater than those required for the usual individual inspection of solid objects.

It is usual in the ultrasonic inspection of materials to make use of a cathode ray tube presentation for the indication of flaws and this has proved, in general, to be the most informative means of flaw analysis. However, as scanning speeds increase, the disadvantage arises that the cathode ray tube trace eventually changes too rapidly to allow the operator to correlate the indication with the position of the probe. A further disadvantage of known testing apparatus is that often the presence and amplitude of flaw echoes form only a selected part or parts of the total range are required to be indicated and the energy received from such part or parts by reflection from a flaw, or in the case of shadow techniques (transmitting and receiving probes on opposite sides of the tested object) the energy loss in direct transmission due to a flaw, is very small in comparison with the total energy received in the whole interval between the injection of successive pulses into the material under test.

The testing apparatus herein disclosed provides apparatus for the ultrasonic testing of materials comprising transducer means for injecting ultrasonic wave energy into, picking up ultrasonic wave energy from the material, and generating electric signals from the energy picked up, and means for selecting from the said signals and applying to an indicating or other responsive device only those picked up during a predetermined limited range of times after injection.

The wave energy is usually in the form of pulses of ultrasonic vibrations and the selecting means may comprise a gating circuit arranged to gate the electric signals from the transducer means, and delay means for applying to the gating circuit gating pulses generated under the control of the injected pulses or break-through therefrom and delayed relatively to the injected pulses.

Alternatively the selecting means may comprise means for applying the signals picked up to produce on a screen a luminous display upon a screen, a photo-electric device located to receive light from the screen and operatively coupled to the responsive device, and masking means arranged to allow light to pass to the photo-electric device from the screen only from a part of the said display. The screen may be that of a cathode ray tube and a time base is provided to deflect the cathode ray beam in one direction and the received signals are applied to deflect the beam in a direction transverse with respect to the first-named direction.

For many purposes it is important that the overall sensitivity of the testing apparatus should remain approximately constant, for instance in spite of changes in the efficiency of the coupling between transducers and the material under test, and an object of the invention is to provide means whereby this can be achieved.

Thus according to a feature of the invention the testing apparatus makes use of a monitoring signal which is arranged to traverse the same path as the testing waves, or a path of substantially the same transmission characteristics, and to use variations in the amplitude of this monitoring signal to control the apparatus in such a manner that variations in the amplitude of signals from the said picked-up energy arising from variations in the coupling between transducers and the material under test are reduced.

Figure 8:
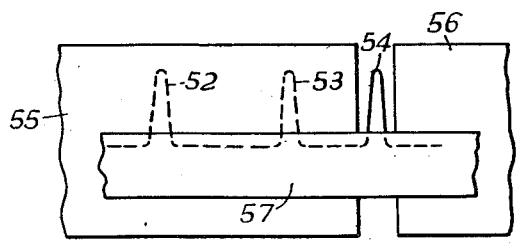
Figure 7:
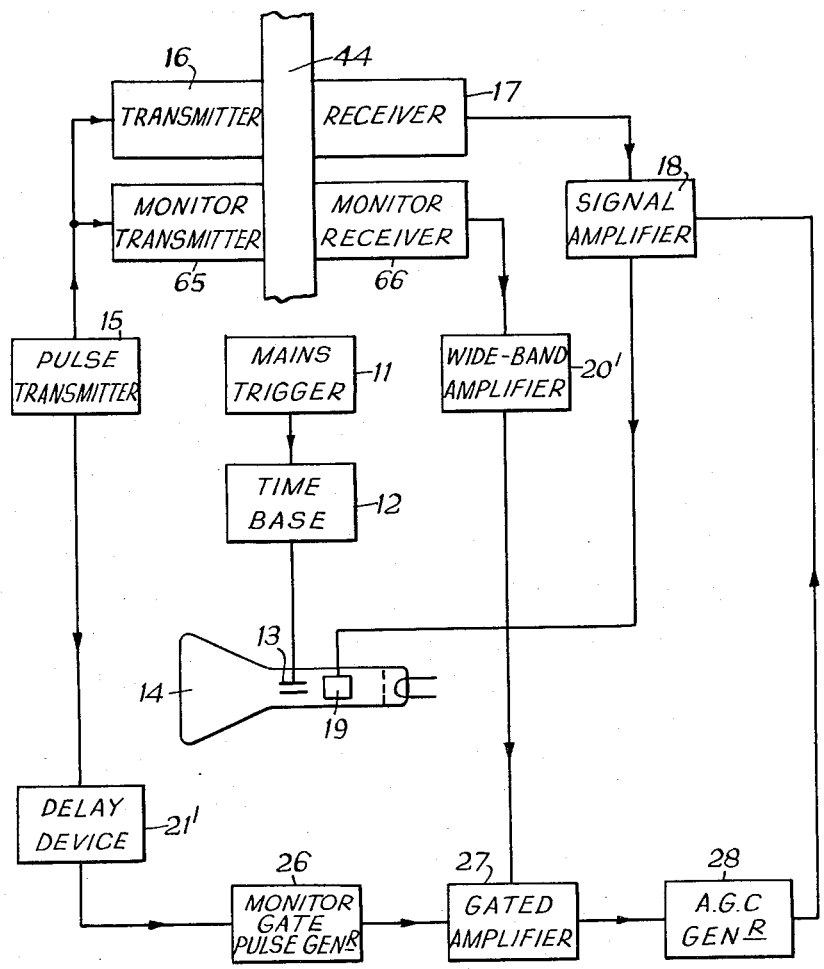

Other objects, features and advantages of the present invention will be apparent from the following description of certain embodiments which is given by way of example with reference to the accompanying drawings in which FIG. 1 is a block circuit diagram of one embodiment,
FIG. 2 shows transducer means that may be used in the circuit of FIG. 1,
FIG. 3 is a block circuit diagram of a modification of a part of FIG. 1,
FIG. 4 is a diagram showing a modification of another part of FIG. 1,
FIGS. 5 and 6 are diagrammatic representations of part of the arrangement of FIG. 4, illustrating the operation of that arrangement,
FIG. 7 is a block circuit diagram of another modification of the embodiment of FIG. 1, and
FIG. 8 is a diagram illustrating the operation of the arrangement of FIG. 7.

Referring to FIGURE 1, the principal constituents of a known flaw detector are shown within a broken line rectangle 10. Thus a mains trigger 11 connected to the mains supply (not shown) controls a time base 12 which generates a saw-tooth wave which is applied to an X-deflecting plate 13 of a cathode ray tube 14. The time base 12 also controls a transmitter 15 which is arranged to generate pulses of ultrasonic electrical oscillations which are applied to a transmitting transducer 16. The transducer 16 may be arranged upon a body under test and waves are received from the body after transmission therethrough or reflection from discontinuities (such as flaws and boundary surfaces) therein at a receiving transducer 17. The electrical signals generated by the transducer 17 are fed to a signal amplifier 18 and thence to a Y-deflecting plate 19 of the tube 14.

Signals from the amplifier 18 are also applied to a wide-band amplifier 20, while trigger pulses from the transmitter 15 are applied to a variable delay device 21 which generates at terminals 22, 23, 24 and 25 pulses delayed in time by progressively increasing amounts relatively to each transmitted pulse, all these delays being preferably adjustable.

For convenience of description, it will be assumed that the transducers 16 and 17 are both arranged upon the upper surface of a flat slab under test and that, therefore, the signals fed to the amplifier 20 as a result of each transmitted pulse comprise echo pulses from any flaws at various distances from the transducer 16 at the region of injection followed by a boundary echo from the bottom of the slab. The slab can be regarded as divided into strata and echoes from any flaws in a stratum near the upper surface will appear at the amplifier 20 as pulses occurring before those due to flaws in a deeper stratum.

The time delay of the pulses at the terminal 25 is chosen to correspond to the bottom echo delay time and these pulses are applied to trigger a monitor gate pulse generator 26 which generates gating pulses which are applied to a gated amplifier 27 to "open" this amplifier to signals from the amplifier 20 at times corresponding to the bottom echoes.

The pulses so gated appearing at the output of the gated amplifier 27 are used, in this example of the invention, as monitoring pulses. They are applied to an automatic gain control generator 28 which generates a voltage whose amplitude is dependent upon the difference between a reference voltage, which may be adjustable by means of a potentiometer, and the amplitude of the monitoring pulses. The voltage from the generator 28, therefore, changes with changes in the efficiency of transmission through the body under test, for example with changes in the effectiveness of the couplings between the transducers 16 and 17 and the body. The voltage from 28 is applied as a gain control to the signal amplifier 18 in such a manner that variations in amplitude of the monitoring pulses (and hence in the other echo signals also) are greatly reduced or substantially eliminated.

The voltage from 28 is also applied to a fault indicator 29 which is arranged to give visual or audible warning when the voltage applied thereto falls below a predetermined value, thereby indicating a failure in the testing apparatus. The indicator 29 may also be arranged to switch off the apparatus.

In the present example it is assumed that the body under test is to be, in effect, divided into three strata each of which can be examined separately for flaws. Of course the number of strata, and hence the number of separate time delays produced by the device 21 can be chosen according to requirements.

Each of the pulses at terminals 22, 23 and 24 is applied to a separate responsive means and since all of these can be alike, only one is shown in FIG. 1. This is represented by the dotted rectangle 30 associated with the terminal 24 of the delay device 21.

The responsive means 30 comprises a flaw gate pulse generator 31 which generates from the delayed pulses applied thereto from 21 gating pulses which are applied to a gated amplifier 32 to "open" this amplifier to signals from the wide band amplifier 20 for the duration of each of the gating pulses. The gated signals correspond to one stratum of the body under test and these signals are applied to a peak voltmeter 33. The voltage from the peak voltmeter is amplified at 34 and fed to a recorder 35, which may be a pen recorder of well-known type, the time base of the recorder being operated from the time base 12.

The output of the amplifier 34 is also applied to a flaw warning indicator 36 arranged to give an audible or visual warning if a signal exceeding a predetermined amplitude is applied to the indicator 36. Thus warning is given when a flaw of more than a predetermined magnitude exists in the stratum corresponding to the responsive means 30.

Other responsive means similar to 30 are associated with the terminals 22 and 23 and with outputs 37 and 38 from the amplifier 20.

Signals from the monitoring gate pulse generator and all the flaw gate pulse generators such as 31 are fed to a mixing circuit 48 and thence to the control grid of the cathode ray tube 14 where they serve to switch on the cathode ray beam only for the durations of the gating pulses.

It will be evident that in FIG. 1 a single recorder 35 may be used for all strata. In the case of a pen recorder, for instance, a separate pen may be provided for each stratum and each pen may be allotted a separate track upon the recording drum.

The transducers 16 and 17 of FIG. 1 may be mounted as shown in FIG. 2. Thus each transducers, which may for example be of quartz or barium titanate, is mounted upon a flat surface of a probe 39 of suitable vibration-transmitting material, the probes being separated by acoustic insulation 40 and the transducer 16 with its probe being arranged to inject transverse vibrations into a body under test. The probe assembly is mounted in a carriage 41 provided with rollers 42. A suitable coupling medium such as oil is provided in the space 43 between the under surfaces of the probes 39 and the upper surface of a body 44 under test. This space 43 is usually made of small depth in the direction of wave propagation so that the coupling medium can be retained by surface tension.

The probe construction shown is suitable for continuous testing, the carriage 41 being held stationary and the material 44 being moved beneath it. It is also suitable for use when the material 44 is stationary and the carriage 41 is moved over it.

The probe design should preferably be such that the monitor and expected flaw signals are of the same order of amplitude. In other words, the amplitude of the signal received from a gross flaw should be, say, one to three times that of the monitor signal.

As will be described hereinafter with reference to FIG. 7, the invention is equally applicable when a common transmitting and receiving probe and transducer is used and also when using a transmitting probe and transducer on one surface of the body under test, say the upper surface of the body 44, and a receiving probe and transducer on the lower surface.

FIG. 3 shows a modification of part of the responsive means of FIG. 1. Voltage from the peak voltmeter 33 is applied to a multivibrator 45 whose frequency of oscillation is dependent upon the magnitude of the voltage applied thereto. The oscillation operates a relay 46 which in turn operates a flashing light source 47. In this way the greater the voltage from 33 (and hence the greater the magnitude of a flaw) the faster the light source 47 flashes.

Although it is preferred to use the boundary echo as monitoring signal, as described, this is not essential. A separate signal may be transmitted through the body under test to constitute the monitoring signal. The same or separate probes may be used for the testing and monitoring but when separate probes are used these should be close to the testing probes in order that operating conditions may be as nearly as possible the same.

FIG. 7 shows an example in which a signal separate from the test signal is used as a monitoring signal.

In FIG. 7, the pulse transmitter 15 applies pulses to a main transmitter transducer 16 and also to a monitor transmitter transducer 65. Waves from the transmitter 16 after traversing a test piece 44 are picked up by the receiver transducer 17 signals from which are applied through the signal amplifier 18 to the Y-deflecting plate 19 of the cathode ray tube 14. Waves from the monitor transmitter 65, after traversing a path in the test piece 44 having substantially the same wave transmission characteristics as the path from 16 to 17, are picked up by a monitor receiver transducer 66. Signals from the transducer 66 are fed through the wide-band amplifier 20′ to the gated amplifier 27.

Pulses from the transmitter 15 are also fed through a delay device 21′ to the monitor gate pulse generator 26 which operates as described with reference to FIG. 1 to generate gating pulses which are applied to the gated amplifier 27. These gating pulses select from the signals applied to the gated amplifier 27 from the wide-band amplifier 20′ monitoring pulses which are applied to the A.G.C. generator 28. The gain control voltage from the generator 28 is applied to control the gain of the signal amplifier 18.

Thus, as in FIG. 1, the gain of the signal amplifier 18 is varied in dependence upon variations in the amplitude of the monitoring pulses in such a manner that the signals applied to the deflecting plate 19 do not vary substantially in amplitude with variations in the transmission characteristics of the transducers 16, 17 and 65, 66.

In the forms of the invention so far described, electronic gating means are employed both for selecting strata in which flaws may be expected and for selecting a stratum (in the example given the lowest stratum) from which the presence of a signal of appropriate amplitude indicates satisfactory operation and the absence of a signal of such amplitude indicates a fault. In another form of the invention this gating is effected electro-optically.

Thus as shown in FIG. 4 there may be provided a cathode ray tube 50 on the screen 51 of which signals from a receiving tranducer 17 are reproduced in the form of deflections in a vertical direction. The tube 50 may be connected as shown and operated in the same manner as the tube 14 in FIG. 1. As indicated in FIG. 5, the signals may take the form of a break-through of the transmitted pulse as at 52, an echo 53 from a flaw, and an echo 54 from a boundary.

In order to operate a flaw-warning indicator to give warning of a flaw, suitable masks are arranged in front of the screen 51. As shown in FIG. 5, these masks may comprise a portion 55 serving to black out the break-through 52, a portion 56 serving to black out the boundary echo 54 and a portion 57 blocking out the base line of the trace.

As shown in FIG. 4, light from the screen 51 is directed by an optical system represented by a lens 58 upon a photo-electric cell 59, the signals from the cell being amplified at 60 and fed to a warning indicator 61. Since the only light that can reach the photo-cell 59 is that from a flaw, the indicator 61 will give a warning of the presence of a flaw.

The mask portions 55, 56 and 57 may be made manually adjustable, if desired by suitable adjusting screws, the portions 55 and 56 horizontally and the portion 57 vertically. By suitable positioning of the mask portions 55 and 56 it can be arranged that warning is given of flaws in a selected stratum of material under test. Separate apparatus such as represented in FIG. 4 may be provided for each of a number of different strata.

In order to provide a warning when the testing apparatus is faulty the same apparatus as is shown in FIG. 4 may be used but the masks are then adjusted as shown in FIG. 6 so that light from the boundary echo 54 is also allowed to pass to the photo-cell 59. If preferred the mask 55 may be moved to the right so that only light from the boundary echo 54 reaches the cell 59.

For some purposes masks of other than rectangular shape may be used.

There may be provided over the screen 51, in addition to the masks, a screen of varying light transmission. For instance the light transmission may vary from substantial opacity at the base line to substantially complete transparency at full deflection of the cathode ray beam represented by a broken line 62 in FIG. 6. The change of transparency may follow any desired law, and may for instance be such as to give a linear relation between echo amplitude and photo-cell current.

Apparatus such as shown in FIG. 4 with the mask portions 55 and 56 adjusted as shown in FIG. 8 to select only the boundary echo 54 to act as a monitoring signal may be used as described with reference to FIG. 1 to control the gain of an amplifier in such a way that the amplitude of the monitoring pulse remains approximately constant. Thus, as shown in FIG. 4, the signal from the amplifier 60 is applied to the A.G.C. generator 28 which supplies a gain control voltage to the signal amplifier 13.

The mask portion 57 may be dispensed with in all cases if the cathode ray tube is normally biased to beam cut-off and if signals are applied to increase the beam intensity.

When using either electronic or electro-optical gating, a narrow gate may be caused to move progressively in the range coordinate and the signals thus selected may be recorded, for instance with a pen recorder.

In the case of the electro-optical gating the narrow slit required need not be close to the screen of the cathode ray tube but may be at a distance therefrom, a suitable optical system including a rotating mirror for example being provided to produce the effect of a gate moving over the trace.

We claim:

1. Apparatus for the ultrasonic testing of materials comprising, transducer means for injecting ultrasonic wave energy into and for picking-up ultrasonic wave energy from the material and generating electric signals from the energy picked up, a source of pulses, means coupling said source to said transducer means and applying said pulses to inject said wave energy, an output channel coupled to said transducer means and transmitting said signal gain, control means in said output channel, time responsive selecting means coupled to said transducer means and selecting from said signals a monitoring signal occurring in predetermined time relation to said pulses, means coupled to said selecting means and generating a control voltage from said monitoring signal and means coupling said control voltage generating means to said gain control means and applying said control voltage to control the gain of said output channel.

2. Apparatus according to claim 1, wherein said selecting means comprise a gating pulse generator, a gating device coupled between said transducer means and said control voltage generating means, and means coupling said gating pulse generator to said gating device to apply gating pulses to open said gating device.

3. Apparatus according to claim 2, wherein said gating pulse generator comprises a source of pulses, and a delay device having an input connected to said source.

4. Apparatus according to claim 1, wherein said selecting means comprise a signal display screen, means applying said signals to generate a luminous display on said screen, photo-electrically responsive means positioned to receive light from said screen, and means limiting the area of screen from which light can pass to said photo-electrically responsive means.

5. Apparatus according to claim 4 comprising means having varying light-transmission disposed between said screen and said responsive means.

6. Apparatus for the ultrasonic testing of materials comprising transducer means for injecting ultrasonic wave energy into and picking up ultrasonic wave energy from the material, and generating electric signals from the energy picked up, a source of pulses, means coupling said source to said transducer means and applying said pulses to inject said wave energy, an amplifier coupled to said transducer means and transmitting said signals, gain control means in said amplifier, means synchronized with the source of pulses for producing a signal at a selected time following each pulse, coincidence means coupled to said amplifier and to said last named means whereby only the echoes from the back of the material being tested are passed therethrough, which is at the selected time, means including a reference voltage connected to said coincidence means and providing a control voltage connected to said gain control means to control the gain of said amplifier in accordance with the amplitude of said back echo.

7. An apparatus for automatically correcting variable conditions during testing of a test piece by ultrasonic echoes, comprising means for generating electrical pulses, a timing device for triggering said generating means, electro-mechanical transducer means connected to said generating means for transmitting ultrasonic pulses into the test piece and receiving echoes thereof including background echoes of the test piece and the echoes from the defects thereof and converting said echoes into input voltages, timing means connected to said timing device and transducer for time selecting said background echo voltage, and electronic comparator means connected to said timing means and having an adjustable electric source for producing a reference voltage, said comparator means comparing a first voltage representing the amplitude of said background echo voltage with said reference voltage to obtain a resultant error voltage, and means connected to said comparator means and said transducer for varying the magnitude of the voltages derived from said transducer in accordance with said error voltage for maintaining said first voltage at a substantially constant value and for producing output voltages varying in magnitude according to said error voltage.

8. An ultrasonic apparatus for testing material, comprising an electrical pulse generator, a triggering generator connected to the pulse generator, an electro-mechanical transducer connected to the pulse generator, a cathode ray tube oscilloscope, a variable gain amplifier with two input terminals and one output terminal, one of said input terminals being connected to the transducer for receiving input voltages corresponding to the background echo and to the echoes of the defects of a workpiece under test, a timing device acting upon the output of said amplifier for time selecting said background echo voltage, electronic comparator means governed by said background echo voltage and having an adjustable electric source for producing a reference voltage, said comparator means comparing a voltage representing the amplitude of said background echo voltage with said reference voltage to obtain a resultant error voltage, said error voltage being applied to the other input terminal of the amplifier for controlling the gain of the variable gain amplifier; the cathode ray tube having vertical deflection plates connected to the output terminal of said variable gain amplifier and a control grid connected to the output of said timing device for intensifying the light spot of the cathode ray tube.

9. Apparatus according to claim 1 comprising flaw indicating means and second time responsive means coupled between said transducer means and said flaw indicating means and constructed to select from said signals flaw signals occurring in predetermined time relation to said pulses.

10. Apparatus according to claim 2 comprising flaw indicating means, a second gating device coupled between said transducer means and said flaw indicating means, and a time-responsive second gating pulse generator coupled to said second gating device to apply gating pulses to open said second gating device in predetermined time relation to said pulses.

11. Apparatus according to claim 10 comprising display means coupled to said output channel to receive said signals, and means coupling each of said gating pulse generators to said display means to render said display means operative in response to said gating pulses throughout the different intervals that the respective gating devices are open.

References Cited in the file of this patent

UNITED STATES PATENTS

| | | |
|---|---|---|
| 2,494,990 | De Lano | Jan. 17, 1950 |
| 2,562,309 | Frederick et al. | July 31, 1951 |
| 2,603,966 | Drake | July 22, 1952 |
| 2,625,659 | Mendelson | Jan. 13, 1953 |
| 2,667,780 | Van Valkenburg | Feb. 2, 1954 |
| 2,675,698 | Johnson | Apr. 20, 1954 |
| 2,736,193 | Van Valkenburg et al. | Feb. 28, 1956 |
| 2,770,966 | Halliday et al. | Nov. 20, 1956 |

FOREIGN PATENTS

| | | |
|---|---|---|
| 476,318 | Canada | Aug. 21, 1951 |
| 521,715 | Belgium | Aug. 14, 1953 |
| 736,464 | Great Britain | Sept. 7, 1955 |